Nov. 7, 1961     D. FIRTH     3,007,748
FLANGE MOUNTED SELF-ALIGNING BEARING
Filed Sept. 25, 1958
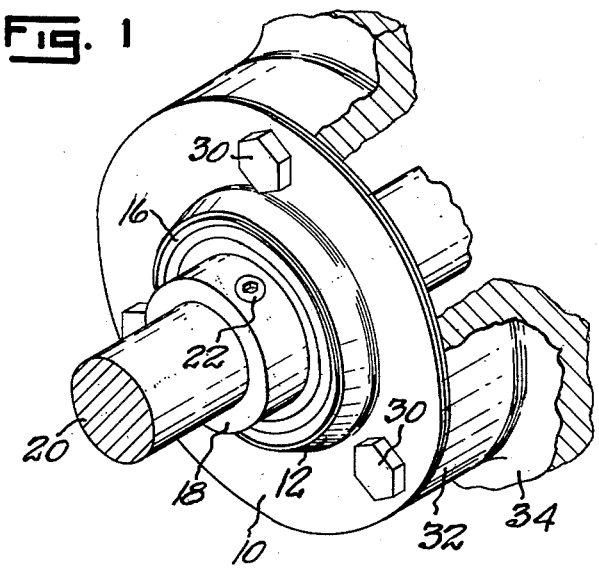
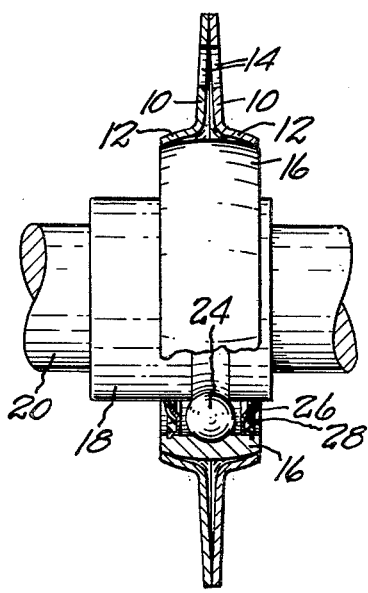
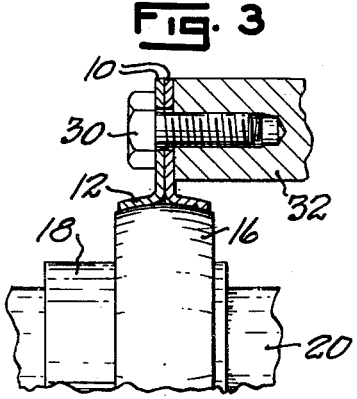
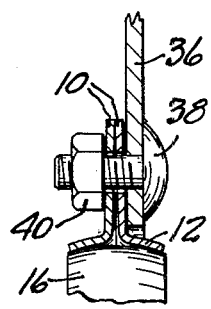
INVENTOR.
DAVID FIRTH.
BY *Eugene C. Knoblock*
ATTORNEY

United States Patent Office 3,007,748
Patented Nov. 7, 1961

3,007,748
FLANGE MOUNTED SELF-ALIGNING BEARING
David Firth, South Bend, Ind., assignor to Dodge Manufacturing Corporation, Mishawaka, Ind., a corporation of Indiana
Filed Sept. 25, 1958, Ser. No. 763,346
2 Claims. (Cl. 308—72)

This invention relates to improvements in flange mounted self-aligning bearings.

The mounting flanges or carriers for self-aligning bearings are usually formed from a pair of metal stampings of substantially the same shape which provide between them, when connected in confronting relation, a part-spherical socket or housing in which is mounted or received the outer part-spherical shell or race of a bearing, such as a ball bearing or a roller bearing. Great difficulty has been experienced in producing metal stampings or carrier parts of a desired uniformity to insure that the bearing may be properly oriented in its carrier for alignment with associated parts of the shaft journaled therein, and at the same time insure that the carrier parts can be drawn together tightly enough for firm securement of the bearing in desired orientation in its carrier.

This difficulty stems from the fact that metal stampings made from sheet metal of the same gauge and made on the same dies in the same presses will, nevertheless, vary. Such variations result from differences in thickness of different pieces of sheet metal of a given gauge, differences in composition and temper of the metal, differences in the grain of the metal, and from progressive wear of forming dies. Thus, despite the greatest efforts to secure exact conformation of the socket-forming flanges of a carrier with the shape and size of the external surface of a bearing race or shell, it has not been possible uniformly to produce housings which will conform to a bearing shell to accommodate self-alignment of the bearing within the shell and to accommodate firm anchorage or mounting of the bearing in its aligned position.

It is the primary object of this invention to overcome the aforementioned deficiencies and difficulties with prior flange mounted self-aligning bearings, and to provide bearing carriers of this type which uniformly conform to a bearing shell to accommodate self-alignment thereof and which accommodate firm securement or mounting of the bearing shell therein.

A further object of this invention is to provide a bearing carrier for a flange mounted unit constructed to provide an initial loose reception of a bearing cage or shell which accommodates self-alignment of the bearing therein and provides desired tightness of securement and retention of the aligned position of the bearing by increasing the clamping action of the members connecting the carrier parts with incident flexing of the carrier parts to effect the desired clamping action.

A further object is to provide a simple, inexpensive carrier unit mounting a self-aligning bearing which is readily adjustable within a range sufficient to accommodate variations in the shape of the carrier parts resulting from differences in thickness, composition, temper, and grain of the metal from which they are formed or from progressive wear of forming dies, and to accommodate variations in the external contour of the outer bearing race mounted thereby.

Other objects will be apparent from the following specification.

In the drawing:

FIG. 1 is a perspective view illustrating the use of a bearing mount secured to a support and mounting in selected orientation a bearing and a shaft journaled thereby;

FIG. 2 is a vertical central sectional view through the bearing mount of FIG. 1, with parts of the bearing being shown in section and with the bearing retaining carrier parts assembled in cooperating relation but unsecured;

FIG. 3 is a fragmentary central sectional view illustrating the manner in which the bearing mount or carrier is secured to a support and is adjusted at one extreme or limit in effecting securement of a bearing; and FIG. 4 is a fragmentary sectional view illustrating another manner of mounting the bearing supporting carrier upon a support, and illustrating another adjustment of the carrier parts effective to provide securement of the bearing in selected position.

Referring to the drawing which illustrates the preferred embodiment of the invention, it will be seen that the bearing mount or carrier is formed of two duplicate parts preferably formed of pressed steel or other metal which are adapted to be secured together to support an anti-friction bearing. Each of the carrier parts comprisese an annular outer plate portion 10 which is slightly dished to concavo-convex form, and a generally tubular flange 12 projecting at substantially right angles to the portion 10 and having a part-spherical or longitudinally curved and tapered inner surface. The plate 10 is preferably circular, and the tubular flange 12 is preferably of uniform width and has its concave face innermost.

Each of the plates 10 is provided with a plurality of holes 14 therein, preferably equally spaced from the center thereof and from each other and located intermediate the width thereof and spaced from flange 12. The openings 14 are adapted to register to receive securing members for connecting the plates 10 and for mounting them on a support.

When the plates 10 are assembled together, as illustrated in FIG. 2, with their concave faces confronting and their flanges 12 in register, the flanges 12 provide a socket for the part-spherical outer race 16 of a bearing, such as a ball bearing. The bearing includes an inner race member 18 adapted to be mounted upon a shaft 20. The inner race 18 may be of a longer axial dimension than the outer race 16 so as to accommodate a set screw or other member 22 for anchoring the inner race to the shaft 20. The bearing may be of any suitable construction to include bearing elements 24 and retainers 26. Also, if desired, oil seals 28 may be provided in the bearing.

The tapered tubular flanges 12 are preferably so shaped that the outer race 16 of the bearing has a loose fit therein when the plates 10 are assembled together with their outer margins in contact, as illustrated in FIG. 2. This permits of the necessary adjustment or orientation of the axis of the bearing and the axis of the shaft 20 with reference to the center plane of the carrier at which the edges of the plate portions 10 contact each other. The assembly is completed by passing securing members, such as machine screws 30, through the registering bores 14 and into a supporting member 32, such as a collar projecting from a machine part 34, as illustrated in FIGS. 1 and 3. The securing members 30 can be tightened to the extent necessary to hold the plates 10 in fixed relation to each other to accommodate a loose fit of the outer bearing race 16 in the socket formed by tubular flanges 12 during the time required to assemble other machine parts and to effect the desired alignment of the shaft 20 therewith. Thereupon the securing members 30 can be tightened to draw the plates 10 together.

FIG. 3 illustrates the plates 10 drawn together in complete contact and to substantially flat form, thus drawing the free edges of the tubular flanges 22 toward each other to engage parts of the outer race bearing 16 of larger diameter than the parts with which they were initially aligned, as seen by comparing the adjustments illustrated in FIGS. 2 and 3. FIG. 4 illustrates tightening by the securing means to an adjustment between that illustrated in FIGS. 2 and 3. Thus it will be apparent that there is a substantial range of adjustment for effecting firm securement of the outer bearing race by the flanges 12 so as to maintain the bearing in any selected alignment.

FIG. 4 also illustrates a modified mounting in which the construction is secured at the face of a plate 36 having an opening therethrough, and wherein the securing members constitute a screw 38 and a nut 40, the shank of said screw passing through an opening in the member 36 and the head of the screw and the inner face of the nut 40 serving to draw the plates 10 toward each other and toward the plate 36 from the position shown in FIG. 2 to the position shown in FIG. 4.

It will be apparent that the concavo-convex form of the sheet metal plate portions 10 renders them resilient, and that the resilience of the plates 10, after initial tightening of the securing members sufficient to at least slightly deform the plates 10, acts to hold the securing members against loosening. In other words, the plates 10 themselves act in the fashion of lock nuts. The extent to which the securing members are drawn up and the extent to which the bearing-engaging tubular flanges 12 are drawn together can vary according to the requirements of each installation. The construction provides a sufficient range of adjustment, however, to take care of variations of the shape of the parts 10, 12 from a normal shape due to differences in thickness of sheet metal parts, difference in grain structure of the metal, difference in the composition and temper of the metal, and difference in parts resulting from tool wear or die wear, and to take care of variations in the size and shape of the outer bearing race 16. At the same time, the number of parts which must be handled to mount the bearing is held at a minimum, the size and cost of the parts is small, and the assembly of the parts and the final adjustment of the parts to effect firm securement can be accomplished rapidly and with simple tools. The securement effected is as strong as may be required and is effected through continuous perimetral or peripheral contact between the flanges 12 and the outer bearing race 16 at circumferential linear areas spaced laterally from the zone of greatest diameter of the part-spherical bearing race 16.

While the preferred embodiment of the invention has been illustrated and described, it will be understood that changes in the construction may be made within the scope of the appended claims without departing from the spirit of the invention.

I claim:

1. A bearing mount for a self-aligning bearing including an outer race having a part-spherical outer surface, comprising a pair of similar members each including a concavo-convex plate portion and a concentric tubular flange projecting from the convex face of said plate portion and having a longitudinally curved concave inner surface, said members being arranged in registering relation with the concave faces of said concavo-convex plate portions confronting and their edges in continuous engagement and a plurality of substantially equi-spaced securing means for drawing said plate portions together to clamp said outer bearing race in said tubular flanges, said tubular flanges having a loose fit on said outer race when the edges of said concavo-convex portions engage.

2. A bearing mount for a self-aligning bearing having an outer race with a part-spherical outer surface, comprising a pair of similar resilient sheet metal members each having an outer dished part and a concentric tubular projecting flange surrounded by said dished part and curved longitudinally with its minimum diameter at its free end, and a plurality of substantially equi-spaced means for securing said members together with their tubular flanges projecting oppositely and their dished plate portions contacting at their margins and flexed to selected extent to clamp said outer bearing race in said tubular flanges, said flanges having a loose fit on said outer race when the edges of said dished parts engage in unflexed condition.

References Cited in the file of this patent

UNITED STATES PATENTS

| | | |
|---|---|---|
| 2,331,652 | Buckendale | Oct. 12, 1943 |
| 2,676,853 | Shafer | Apr. 27, 1954 |
| 2,733,648 | Todd | Feb. 7, 1956 |
| 2,797,969 | Uthoff | July 2, 1957 |

FOREIGN PATENTS

| | | |
|---|---|---|
| 23,327 | Finland | July 7, 1949 |